(12) United States Patent
McMillen (10) Patent No.: US 9,696,833 B2
(45) Date of Patent: Jul. 4, 2017

(54) PROMOTING SENSOR ISOLATION AND PERFORMANCE IN FLEXIBLE SENSOR ARRAYS

(71) Applicant: BeBop Sensors, Inc., Berkeley, CA (US)

(72) Inventor: Keith A. McMillen, Berkeley, CA (US)

(73) Assignee: Bebop Sensors, Inc., Berkeley, CA (US)

( * ) Notice: Subject to any disclaimer, the term of this patent is extended or adjusted under 35 U.S.C. 154(b) by 32 days.

(21) Appl. No.: 14/671,844

(22) Filed: Mar. 27, 2015

(65) Prior Publication Data

US 2015/0331512 A1    Nov. 19, 2015

Related U.S. Application Data

(63) Continuation-in-part of application No. 14/299,976, filed on Jun. 9, 2014.

(60) Provisional application No. 61/993,953, filed on May 15, 2014, provisional application No. 62/056,819, filed on Sep. 29, 2014.

(51) Int. Cl.
| | |
|---|---|
| G01L 1/20 | (2006.01) |
| G01L 1/18 | (2006.01) |
| G06F 3/045 | (2006.01) |
| G06F 3/041 | (2006.01) |
| G01L 9/00 | (2006.01) |
| G06F 1/16 | (2006.01) |
| G06F 3/047 | (2006.01) |
| G01L 1/14 | (2006.01) |
| G01L 5/00 | (2006.01) |
| G01L 1/26 | (2006.01) |

(52) U.S. Cl.
CPC .............. *G06F 3/041* (2013.01); *G01L 1/18* (2013.01); *G01L 1/205* (2013.01); *G01L 9/0052* (2013.01); *G06F 1/163* (2013.01); *G06F 3/045* (2013.01); *G06F 3/047* (2013.01); *G06F 3/0414* (2013.01); *G01L 1/146* (2013.01); *G01L 1/26* (2013.01); *G01L 5/0038* (2013.01); *G06F 2203/04102* (2013.01)

(58) Field of Classification Search
None
See application file for complete search history.

(56) References Cited

U.S. PATENT DOCUMENTS

| | | |
|---|---|---|
| 4,294,014 A | 10/1981 | Baumann et al. |
| 4,438,291 A | 3/1984 | Eichelberger et al. |
| 4,852,443 A | 8/1989 | Duncan et al. |

(Continued)

FOREIGN PATENT DOCUMENTS

| | | |
|---|---|---|
| CN | 200980381 Y | 11/2007 |
| CN | 201920728 U | 8/2011 |

(Continued)

OTHER PUBLICATIONS

U.S. Appl. No. 14/299,976, filed Jun. 9, 2014, McMillen.

(Continued)

*Primary Examiner* — Dismery Mercedes
(74) *Attorney, Agent, or Firm* — Weaver Austin Villeneuve & Sampson LLP (57) ABSTRACT

Sensors incorporating piezoresistive materials are described. One class of sensors includes conductive traces formed directly on or otherwise integrated with the piezoresistive material.

18 Claims, 9 Drawing Sheets

(56) References Cited

U.S. PATENT DOCUMENTS

| | | | |
|---|---|---|---|
| 5,033,291 | A | 7/1991 | Podoloff et al. |
| 5,128,880 | A | 7/1992 | White |
| 5,131,306 | A | 7/1992 | Yamamoto |
| 5,237,520 | A | 8/1993 | White |
| 5,288,938 | A | 2/1994 | Wheaton |
| 5,429,092 | A | 7/1995 | Kamei |
| 5,571,973 | A * | 11/1996 | Taylot .................. A61B 5/1036 73/862.046 |
| 5,578,766 | A | 11/1996 | Kondo |
| 5,659,395 | A | 8/1997 | Brown et al. |
| 5,695,859 | A | 12/1997 | Burgess |
| 5,729,905 | A | 3/1998 | Mathiasmeier et al. |
| 5,822,223 | A | 10/1998 | Genest |
| 5,866,829 | A | 2/1999 | Pecoraro |
| 5,878,359 | A | 3/1999 | Takeda |
| 5,943,044 | A | 8/1999 | Martinelli et al. |
| 5,989,700 | A | 11/1999 | Krivopal |
| 6,029,358 | A | 2/2000 | Mathiasmeier et al. |
| 6,155,120 | A * | 12/2000 | Taylor .................. A61B 5/1036 73/862.046 |
| 6,215,055 | B1 | 4/2001 | Saravis |
| 6,216,545 | B1 | 4/2001 | Taylor |
| 6,304,840 | B1 | 10/2001 | Vance et al. |
| 6,331,893 | B1 | 12/2001 | Brown et al. |
| 6,360,615 | B1 | 3/2002 | Smela |
| 6,486,776 | B1 | 11/2002 | Pollack et al. |
| 6,815,602 | B2 | 11/2004 | De Franco |
| 6,822,635 | B2 | 11/2004 | Shahoian et al. |
| 6,829,942 | B2 | 12/2004 | Yanai et al. |
| 6,964,205 | B2 * | 11/2005 | Papakostas ............... G01L 1/20 73/862.046 |
| 7,157,640 | B2 | 1/2007 | Baggs |
| 7,332,670 | B2 | 2/2008 | Fujiwara et al. |
| 7,409,256 | B2 | 8/2008 | Lin et al. |
| 7,493,230 | B2 | 2/2009 | Schwartz et al. |
| 7,536,794 | B2 | 5/2009 | Hay et al. |
| 7,608,776 | B2 | 10/2009 | Ludwig |
| 7,719,007 | B2 * | 5/2010 | Tompkins ............... G01L 1/142 257/48 |
| 7,754,956 | B2 | 7/2010 | Gain et al. |
| 7,780,541 | B2 | 8/2010 | Bauer |
| 7,855,718 | B2 | 12/2010 | Westerman |
| 7,928,312 | B2 | 4/2011 | Sharma |
| 7,984,544 | B2 | 7/2011 | Rosenberg |
| 8,117,922 | B2 | 2/2012 | Xia et al. |
| 8,161,826 | B1 * | 4/2012 | Taylor ................... G01L 1/18 73/862.041 |
| 8,274,485 | B2 | 9/2012 | Liu et al. |
| 8,448,530 | B2 | 5/2013 | Leuenberger et al. |
| 8,479,585 | B2 | 7/2013 | Shaw-Klein |
| 8,536,880 | B2 * | 9/2013 | Philipp ............... G06F 3/03547 324/658 |
| 8,680,390 | B2 | 3/2014 | McMillen et al. |
| 8,884,913 | B2 | 11/2014 | Saynac et al. |
| 8,904,876 | B2 * | 12/2014 | Taylor ................... G01L 1/18 361/283.4 |
| 8,925,393 | B2 * | 1/2015 | Cannard .................. D04B 1/14 73/862 |
| 8,945,328 | B2 * | 2/2015 | Longinotti-Buitoni A61B 5/0002 156/234 |
| 8,964,205 | B2 | 2/2015 | Shimizu |
| 9,038,482 | B2 | 5/2015 | Xia et al. |
| 9,075,404 | B2 | 7/2015 | McMillen et al. |
| 9,076,419 | B2 | 7/2015 | McMillen et al. |
| 9,271,665 | B2 | 3/2016 | Sarrafzadeh et al. |
| 9,442,614 | B2 | 9/2016 | McMillen |
| 9,546,921 | B2 | 1/2017 | McMillen et al. |
| 2002/0078757 | A1 | 6/2002 | Hines et al. |
| 2004/0031180 | A1 | 2/2004 | Ivanov |
| 2004/0093746 | A1 | 5/2004 | Varsallona |
| 2004/0183648 | A1 | 9/2004 | Weber et al. |
| 2004/0189145 | A1 * | 9/2004 | Pletner .................... G03F 7/709 310/311 |
| 2005/0109095 | A1 | 5/2005 | Sinnett |
| 2007/0129776 | A1 | 6/2007 | Robins et al. |
| 2007/0188179 | A1 | 8/2007 | Deangelis et al. |
| 2007/0188180 | A1 * | 8/2007 | Deangelis ............ G01D 5/2405 324/661 |
| 2007/0202765 | A1 | 8/2007 | Krans et al. |
| 2007/0234888 | A1 | 10/2007 | Rotolo de Moraes |
| 2008/0158145 | A1 | 7/2008 | Westerman |
| 2008/0254824 | A1 | 10/2008 | Moraes |
| 2009/0049980 | A1 | 2/2009 | Sharma |
| 2009/0237374 | A1 | 9/2009 | Li et al. |
| 2009/0272197 | A1 * | 11/2009 | Ridao Granado ........ G01L 1/20 73/828 |
| 2009/0301190 | A1 * | 12/2009 | Ross, Jr. ............... G01F 23/265 73/304 C |
| 2010/0134327 | A1 | 6/2010 | Dinh et al. |
| 2010/0149108 | A1 | 6/2010 | Hotelling et al. |
| 2010/0179724 | A1 | 7/2010 | Weston |
| 2010/0274447 | A1 | 10/2010 | Stumpf |
| 2010/0286951 | A1 | 11/2010 | Danenberg et al. |
| 2010/0292945 | A1 | 11/2010 | Reynolds et al. |
| 2010/0315337 | A1 | 12/2010 | Ferren et al. |
| 2011/0088535 | A1 | 4/2011 | Zarimis |
| 2011/0088536 | A1 | 4/2011 | McMillen et al. |
| 2011/0141052 | A1 * | 6/2011 | Bernstein ............... G06F 3/016 345/174 |
| 2011/0241850 | A1 | 10/2011 | Bosch et al. |
| 2011/0246028 | A1 | 10/2011 | Lisseman et al. |
| 2011/0260994 | A1 | 10/2011 | Saynac et al. |
| 2011/0271772 | A1 * | 11/2011 | Parks ..................... G01L 5/228 73/862.046 |
| 2012/0007831 | A1 | 1/2012 | Chang et al. |
| 2012/0026124 | A1 | 2/2012 | Li et al. |
| 2012/0055257 | A1 | 3/2012 | Shaw-Klein |
| 2012/0143092 | A1 | 6/2012 | Xia et al. |
| 2012/0191554 | A1 | 7/2012 | Xia et al. |
| 2012/0197161 | A1 | 8/2012 | Xia et al. |
| 2012/0198949 | A1 | 8/2012 | Xia et al. |
| 2012/0234105 | A1 | 9/2012 | Taylor |
| 2012/0283979 | A1 | 11/2012 | Bruekers et al. |
| 2012/0296528 | A1 | 11/2012 | Wellhoefer et al. |
| 2012/0297885 | A1 | 11/2012 | Hou et al. |
| 2012/0323501 | A1 | 12/2012 | Sarrafzadeh et al. |
| 2013/0009905 | A1 | 1/2013 | Castillo et al. |
| 2013/0055482 | A1 | 3/2013 | D'Aprile et al. |
| 2013/0082970 | A1 | 4/2013 | Frey et al. |
| 2013/0085394 | A1 | 4/2013 | Corbett, III et al. |
| 2013/0113057 | A1 | 5/2013 | Taylor |
| 2013/0192071 | A1 | 8/2013 | Esposito et al. |
| 2013/0211208 | A1 * | 8/2013 | Varadan ............ A61B 5/14552 600/301 |
| 2013/0239787 | A1 | 9/2013 | McMillen et al. |
| 2013/0274985 | A1 | 10/2013 | Lee et al. |
| 2013/0275057 | A1 * | 10/2013 | Perlin .................. G06F 3/0414 702/41 |
| 2013/0327560 | A1 | 12/2013 | Ichiki |
| 2014/0007704 | A1 | 1/2014 | Granado et al. |
| 2014/0033829 | A1 | 2/2014 | Xia et al. |
| 2014/0090488 | A1 | 4/2014 | Taylor et al. |
| 2014/0107966 | A1 | 4/2014 | Xia et al. |
| 2014/0107967 | A1 | 4/2014 | Xia et al. |
| 2014/0107968 | A1 | 4/2014 | Xia et al. |
| 2014/0125124 | A1 | 5/2014 | Verner |
| 2014/0130593 | A1 | 5/2014 | Ciou et al. |
| 2014/0150573 | A1 | 6/2014 | Cannard et al. |
| 2014/0182170 | A1 | 7/2014 | Wawrousek et al. |
| 2014/0195023 | A1 | 7/2014 | Statham et al. |
| 2014/0215684 | A1 | 8/2014 | Hardy et al. |
| 2014/0222243 | A1 | 8/2014 | McMillen et al. |
| 2014/0318699 | A1 | 10/2014 | Longinotti-Buitoni et al. |
| 2014/0347076 | A1 * | 11/2014 | Barton .................. G06F 3/0488 324/663 |
| 2015/0084873 | A1 | 3/2015 | Hagenbuch et al. |
| 2015/0086955 | A1 | 3/2015 | Poniatowski et al. |
| 2015/0168238 | A1 * | 6/2015 | Raut .................. G01N 27/048 702/42 |
| 2015/0261372 | A1 | 9/2015 | McMillen et al. |
| 2015/0316434 | A1 | 11/2015 | McMillen et al. |
| 2015/0317964 | A1 | 11/2015 | McMillen et al. |

(56) References Cited

U.S. PATENT DOCUMENTS

| | | |
|---|---|---|
| 2015/0331522 A1 | 11/2015 | McMillen et al. |
| 2015/0331523 A1 | 11/2015 | McMillen et al. |
| 2015/0331524 A1 | 11/2015 | McMillen et al. |
| 2015/0331533 A1 | 11/2015 | McMillen et al. |
| 2015/0370396 A1* | 12/2015 | Hotelling .............. G06F 3/0414 345/174 |
| 2016/0054798 A1 | 2/2016 | Messingher et al. |
| 2016/0070347 A1 | 3/2016 | McMillen et al. |
| 2016/0252412 A1 | 9/2016 | McMillen et al. |
| 2016/0318356 A1 | 11/2016 | McMillen et al. |
| 2016/0375910 A1 | 12/2016 | McMillen et al. |

FOREIGN PATENT DOCUMENTS

| | | |
|---|---|---|
| CN | 102551728 A | 7/2012 |
| CN | 202396601 U | 8/2012 |
| CN | 203234132 U | 10/2013 |
| CN | 102406280 B | 3/2014 |
| DE | 11 2010 004 038 T5 | 9/2012 |
| EP | 0 014 022 B1 | 11/1984 |
| EP | 2 682 724 A1 | 1/2014 |
| JP | H08-194481 | 7/1996 |
| JP | 2000-267664 A | 9/2000 |
| JP | 2008-515008 A | 5/2008 |
| KR | 10-2007-0008500 A | 1/2007 |
| KR | 100865148 B1 | 10/2008 |
| KR | 10-1362742 B1 | 2/2014 |
| KR | 10-2014-0071693 A | 6/2014 |
| NL | 8900820 A | 11/1990 |
| WO | WO 99/20179 A1 | 4/1999 |
| WO | WO 2007/024875 A2 | 3/2007 |
| WO | WO 2009/155891 A1 | 12/2009 |
| WO | WO 2011/047171 | 4/2011 |
| WO | WO 2015/175317 A1 | 11/2015 |
| WO | PCT/US16/16513 | 2/2016 |
| WO | PCT/US16/29528 | 4/2016 |
| WO | WO 2016/070078 A1 | 5/2016 |
| WO | WO 2016/138234 A1 | 9/2016 |
| WO | PCT/US16/55997 | 10/2016 |
| WO | WO 2016/176307 A1 | 11/2016 |
| WO | WO 2016/210173 A1 | 12/2016 |

OTHER PUBLICATIONS

U.S. Appl. No. 14/464,551, filed Aug. 20, 2014, McMillen.
U.S. Appl. No. 14/671,821, filed Mar. 27, 2015, McMillen.
U.S. Office Action dated Sep. 12, 2012 issued in U.S. Appl. No. 12/904,657.
U.S. Office Action dated Apr. 15, 2013 issued in U.S. Appl. No. 12/904,657.
U.S. Notice of Allowance dated Nov. 8, 2013 issued in U.S. Appl. No. 12/904,657.
U.S. Office Action dated Mar. 12, 2015 issued in U.S. Appl. No. 14/173,617.
U.S. Office Action dated Apr. 2, 2015 issued in U.S. Appl. No. 13/799,304.
PCT International Search Report dated May 27, 2011, issued in PCT/US2010/052701.
PCT International Preliminary Report on Patentability and Written Opinion dated Apr. 26, 2012, issued in PCT/US2010/052701.
Japanese Office Action dated Feb. 25, 2014 issued in JP 2012-534361.
Roh, Jung-Sim et al. (2011) "Robust and reliable fabric and piezoresistive multitouch sensing surfaces for musical controllers," from Alexander Refsum Jensenius, Recorded at: 11th International Conference on New Interfaces for Musical Expression May 30-Jun. 1, 2011, Oslo, Norway, a vimeo download at http://vimeo.com/26906580.
U.S. Appl. No. 15/052,293, filed Feb. 24, 2016, McMillen et al.
U.S. Notice of Allowance dated May 1, 2015 issued in U.S. Appl. No. 14/173,617.
U.S. Notice of Allowance dated Apr. 24, 2015 issued in U.S. Appl. No. 13/799,304.
U.S. Office Action dated Sep. 1, 2015 issued in U.S. Appl. No. 14/728,872.
U.S. Office Action dated Jan. 13, 2016 issued in U.S. Appl. No. 14/464,551.
PCT International Search Report and Written Opinion dated Sep. 3, 2015 issued in PCT/US2015/029732.
"Electronic Foot Size Measuring Devices," *Sensatech Research LTD., Custom Electronic Sensing Solutions*, Registered Office: 4 Heath Square, Boltro Road, Haywards Heath, RH16 1BL Company Registration No. 4524018 Cardiff [retrieved at http:www.electronicsarena.co.uk/companies/sensatech-research/products/electronic-foot-size-measureing-devices on Sep. 17, 2015], 3 pages.
"iStep® Digital Foot Scan," (© 2002-2015) [retrieved at http://www.foot.com/site/iStep on Sep. 17, 2015], 1 page.
"Podotech Elftman," and Podotech Elftman Brochure (UK Version) [retrieved at http://www.podotech.com/diagnostics/podotech-elft-man-2/ on Sep. 17, 2015] podo+tech®, Foot Care Technology Solutions, 7 pages.
"The Emed®-Systems," [retrieved at http://www.novel.de/novelcontent/emed on Sep. 17, 2015] *novel.de*, 4 pages.
U.S. Appl. No. 15/138,802, filed Apr. 26, 2016, McMillen.
U.S. Office Action dated Mar. 10, 2016 issued in U.S. Appl. No. 14/727,619.
U.S. Final Office Action dated Jul. 18, 2016 issued in U.S. Appl. No. 14/727,619.
U.S. Final Office Action dated Mar. 9, 2016 issued in U.S. Appl. No. 14/728,872.
U.S. Office Action dated Jun. 22, 2016 issued in U.S. Appl. No. 14/728,872.
U.S. Office Action dated Jul. 25, 2016 issued in U.S. Appl. No. 14/728,873.
U.S. Office Action dated Mar. 9, 2016 issued in U.S. Appl. No. 14/299,976.
U.S. Final Office Action dated Jul. 6, 2016 issued in U.S. Appl. No. 14/299,976.
U.S. Notice of Allowance dated Jun. 23, 2016 issued in U.S. Appl. No. 14/464,551.
U.S. Office Action dated May 20, 2016 issued in U.S. Appl. No. 14/928,058.
PCT International Search Report and Written Opinion dated May 26, 2016 issued in PCT/US2016/019513.
PCT International Search Report and Written Opinion dated Apr. 14, 2016 issued in PCT/US2015/058370.
U.S. Appl. No. 15/251,772, filed Aug. 30, 2016, McMillen.
U.S. Appl. No. 15/287,520, filed Oct. 6, 2016, McMillen et al.
U.S. Appl. No. 15/374,816, filed Dec. 9, 2016, McMillen et al.
U.S. Notice of Allowance dated Sep. 15, 2016 issued in U.S. Appl. No. 14/727,619.
U.S. Final Office Action dated Oct. 18, 2016 issued in U.S. Appl. No. 14/728,872.
U.S. Office Action dated Dec. 30, 2016 issued in U.S. Appl. No. 14/728,873.
U.S. Office Action dated Oct. 21, 2016 issued in U.S. Appl. No. 14/299,976.
U.S. Office Action dated Sep. 23, 2016 issued in U.S. Appl. No. 14/800,538.
U.S. Notice of Allowance dated Jan. 17, 2017 issued in U.S. Appl. No. 14/800,538.
U.S. Final Office Action dated Jan. 6, 2017 issued in U.S. Appl. No. 14/928,058.
U.S. Office Action dated Dec. 27, 2016 issued in U.S. Appl. No. 15/287,520.
PCT International Preliminary Report on Patentability and Written Opinion dated Nov. 24, 2016 issued in PCT/US2015/029732.
PCT International Search Report and Written Opinion dated Sep. 15, 2016 issued in PCT/US2016/029528.
PCT International Search Report and Written Opinion dated Sep. 29, 2016 issued in PCT/US2016/039089.

\* cited by examiner

PROMOTING SENSOR ISOLATION AND PERFORMANCE IN FLEXIBLE SENSOR ARRAYS

RELATED APPLICATION DATA

The present application is a continuation-in-part application and claims priority under 35 U.S.C. 120 to U.S. patent application Ser. No. 14/299,976 entitled Piezoresistive Sensors and Applications filed on Jun. 9, 2014. The present application is also a non-provisional of and claims priority under 35 U.S.C. 119(e) to each of U.S. Provisional Patent Application No. 61/993,953 entitled Piezoresistive Sensors and Applications filed on May 15, 2014 and U.S. Provisional Patent Application No. 62/056,819 entitled Promoting Sensor Isolation and Performance in Flexible Sensor Arrays filed on Sep. 29, 2014. The entire disclosures of each of these applications is incorporated herein by reference for all purposes.

BACKGROUND

Demand is rapidly rising for technologies that bridge the gap between the computing devices and the physical world. These interfaces typically require some form of sensor technology that translates information from the physical domain to the digital domain. The "Internet of Things" contemplates the use of sensors in a virtually limitless range of applications, for many of which conventional sensor technology is not well suited.

SUMMARY

According to various implementations, sensors and applications of sensors are provided. According to a particular class of implementations, a sensor or sensor system includes a flexible substrate and two or more conductive traces formed directly on or otherwise integrated with the substrate.

According to some implementations, a sensor includes a flexible substrate and a sensor trace pattern including two or more conductive traces integrated with the substrate. A stiffener is attached to the flexible substrate in a vicinity of the sensor trace pattern. The stiffener resists distortion of the traces when the substrate is distorted.

According to some implementations, a sensor includes a flexible substrate and a sensor trace pattern including two or more conductive traces integrated with the substrate. An additional trace is integrated with the substrate in a vicinity of the sensor trace pattern. Circuitry is configured to receive a sensor output signal from the sensor trace pattern and a compensation signal from the additional trace, and to detect activation of the sensor with reference to the sensor output signal and using the compensation signal to compensate for distortion of the flexible substrate.

According to some implementations, a sensor includes a flexible substrate and a sensor trace pattern including two or more conductive traces integrated with the substrate. The flexible substrate includes one or more apertures in a vicinity of the sensor trace pattern that physically isolate the traces of the sensor trace pattern from physical distortion of the flexible substrate.

A further understanding of the nature and advantages of various implementations may be realized by reference to the remaining portions of the specification and the drawings.

DETAILED DESCRIPTION

Sensors incorporating piezoresistive materials are described in this disclosure. Specific implementations are described below including the best modes contemplated. Examples of these implementations are illustrated in the accompanying drawings. However, the scope of this disclosure is not limited to the described implementations. Rather, this disclosure is intended to cover alternatives, modifications, and equivalents of these implementations. In the following description, specific details are set forth in order to provide a thorough understanding of the described implementations. Some implementations may be practiced without some or all of these specific details. In addition, well known features may not have been described in detail to promote clarity.

Piezoresistive materials include any of a class of materials that exhibit a change in electrical resistance in response to mechanical force or pressure applied to the material. One class of sensors described herein includes conductive traces formed directly on or otherwise integrated with a flexible substrate of piezoresistive material, e.g., a piezoresistive fabric or other flexible material. When force or pressure is applied to such a sensor, the resistance between traces connected by the piezoresistive material changes in a time-varying manner that is representative of the applied force. A signal representative of the magnitude of the applied force is generated based on the change in resistance. This signal is captured via the conductive traces (e.g., as a voltage or a current), digitized (e.g., via an analog-to-digital converter), processed (e.g., by an associated processor or controller or suitable control circuitry), and mapped (e.g., by the associated processor, controller, or control circuitry) to a control function that may be used in conjunction with virtually any type of process, device, or system. In some implementations, arrays of conductive traces having various configurations are used to determine the direction and/or velocity of the applied force in one or more dimensions (e.g., in addition to the magnitude of the force or pressure). The output signals from such sensors may also be used to detect a variety of distortions and/or deformations of the substrate on which they are formed or with which they are integrated such as, for example, bends, stretches, torsions, rotations, etc.

Printing, screening, depositing, or otherwise forming conductive traces directly onto flexible piezoresistive material allows for the creation of a sensor or sensor array that fits any arbitrary shape or volume. The piezoresistive material may be any of a variety of woven and non-woven fabrics having piezoresistive properties. Implementations are also contemplated in which the piezoresistive material may be any of a variety of flexible, stretchable, or otherwise deformable materials (e.g., rubber, or a stretchable fabric such as spandex or open mesh fabrics) having piezoresistive properties. The conductive traces may be formed using any of a variety of conductive inks or paints. Implementations are also contemplated in which the conductive traces are formed using any flexible conductive material that may be formed on the flexible piezoresistive material. It should therefore be understood that, while specific implementations are described with reference to specific materials and techniques, the scope of this disclosure is not so limited.

Both one-sided and two-side implementations are contemplated, e.g., conductive traces can be printed on one or both sides of the piezoresistive fabric. As will be understood, two-sided implementations may require some mechanism for connecting conductive traces on one side of the fabric to those on the other side. Some implementations use vias in which conductive ink or paint is flowed through the vias to establish the connections. Alternatively, metal vias or rivets may make connections through the fabric.

Both single and double-sided implementations may use insulating materials formed over conductive traces. This allows for the stacking or layering of conductive traces and signal lines, e.g., to allow the routing of signal line to isolated structures in a manner analogous to the different layers of a printed circuit board.

Routing of signals on and off the piezoresistive fabric may be achieved in a variety of ways. A particular class of implementations uses elastomeric connectors (e.g., ZEBRA® connectors) which alternate conductive and non-conductive rubber at a density typically an order of magnitude greater than the width of the conductive traces to which they connect (e.g., at the edge of the fabric). Alternatively, a circuit board (possibly made of a flexible material such as Kapton), or a bundle of conductors may be riveted to the fabric. The use of rivets may also provide mechanical reinforcement to the connection.

Matching conductive traces or pads on both the piezoresistive material and a circuit board can be made to face each. A layer of conductive adhesive (e.g., a conductive epoxy such as Masterbond EP79 from Masterbond, Inc. of Hackensack, N.J.) can be applied to one of the surfaces and then mated to the other surface. The conductive traces or pads can also be held together with additional mechanical elements such as a plastic sonic weld or rivets. If conductive rivets are used to make the electrical connections to the conductive traces of the piezoresistive fabric, the conductive adhesive may not be required. Conductive threads may also be used to connect the conductive traces of the fabric to an external assembly.

According to a particular class of implementations, the piezoresistive material is a pressure sensitive fabric manufactured by Eeonyx, Inc., of Pinole, Calif. The fabric includes conductive particles that are polymerized to keep them suspended in the fabric. The base material is a polyester felt selected for uniformity in density and thickness as this promotes greater uniformity in conductivity of the finished piezoresistive fabric. That is, the mechanical uniformity of the base material results in a more even distribution of conductive particles when the slurry containing the conductive particles is introduced. The fabric may be woven. Alternatively, the fabric may be non-woven such as, for example, a calendared fabric e.g., fibers, bonded together by chemical, mechanical, heat or solvent treatment. Calendared material presents a smoother outer surface which promotes more accurate screening of conductive inks than a non-calendared material.

The conductive particles in the fabric may be any of a wide variety of materials including, for example, silver, copper, gold, aluminum, carbon, etc. Some implementations may employ carbon graphenes that are formed to grip the fabric. Such materials may be fabricated using techniques described in U.S. Pat. No. 7,468,332 for Electroconductive Woven and Non-Woven Fabric issued on Dec. 23, 2008, the entire disclosure of which is incorporated herein by reference for all purposes. However, it should again be noted that any flexible material that exhibits a change in resistance or conductivity when pressure is applied to the material and on which conductive traces may be printed, screened, deposited, or otherwise formed will be suitable for implementation of sensors as described herein.

Conductive particles may be introduced to the fabric using a solution or slurry, the moisture from which is then removed. According to some implementations, the way in which the moisture is removed from the fabric may also promote uniformity. For example, using an evenly distributed array of vacuum heads or ports to pull the moisture from the fabric reduces the concentrations of conductive particles around individual vacuum heads or ports. The vacuum heads or ports may be arranged in 1 or 2 dimensional arrays; the latter being analogized to a reverse air hockey table, i.e., an array of vacuum ports which pull air in rather than push air out.

Implementations are also contemplated in which the uniformity of the piezoresistive fabric is not necessarily very good. Such implementations may use multiple, closely-spaced sensors operating in parallel, the outputs of which can be averaged to get more accurate and/or consistent readings.

According to a particular class of implementations, conductive traces having varying levels of conductivity are formed on the piezoresistive material using conductive silicone-based inks manufactured by, for example, E.I. du Pont de Nemours and Company (DuPont) of Wilmington, Del., and/or Creative Materials of Ayer, Mass. An example of a conductive ink suitable for implementing highly conductive traces for use with various implementations is product number 125-19 from Creative Materials, a flexible, high temperature, electrically conductive ink. Examples of conductive inks for implementing lower conductivity traces for use with various implementations are product numbers 7102 and 7105 from DuPont, both carbon conductive compositions. Examples of dielectric materials suitable for implementing insulators for use with various implementations are product numbers 5018 and 5036 from DuPont, a UV curable dielectric and an encapsulant, respectively. These inks are flexible and durable and can handle creasing, washing, etc. The degree of conductivity for different traces and applications is controlled by the amount or concentration of conductive particles (e.g., silver, copper, aluminum, carbon, etc.) suspended in the silicone. These inks can be screen printed or printed from an inkjet printer. Another class of implementations uses conductive paints (e.g., carbon particles mixed with paint) such as those that are commonly used for EMI shielding and ESD protection.

Figure 1:
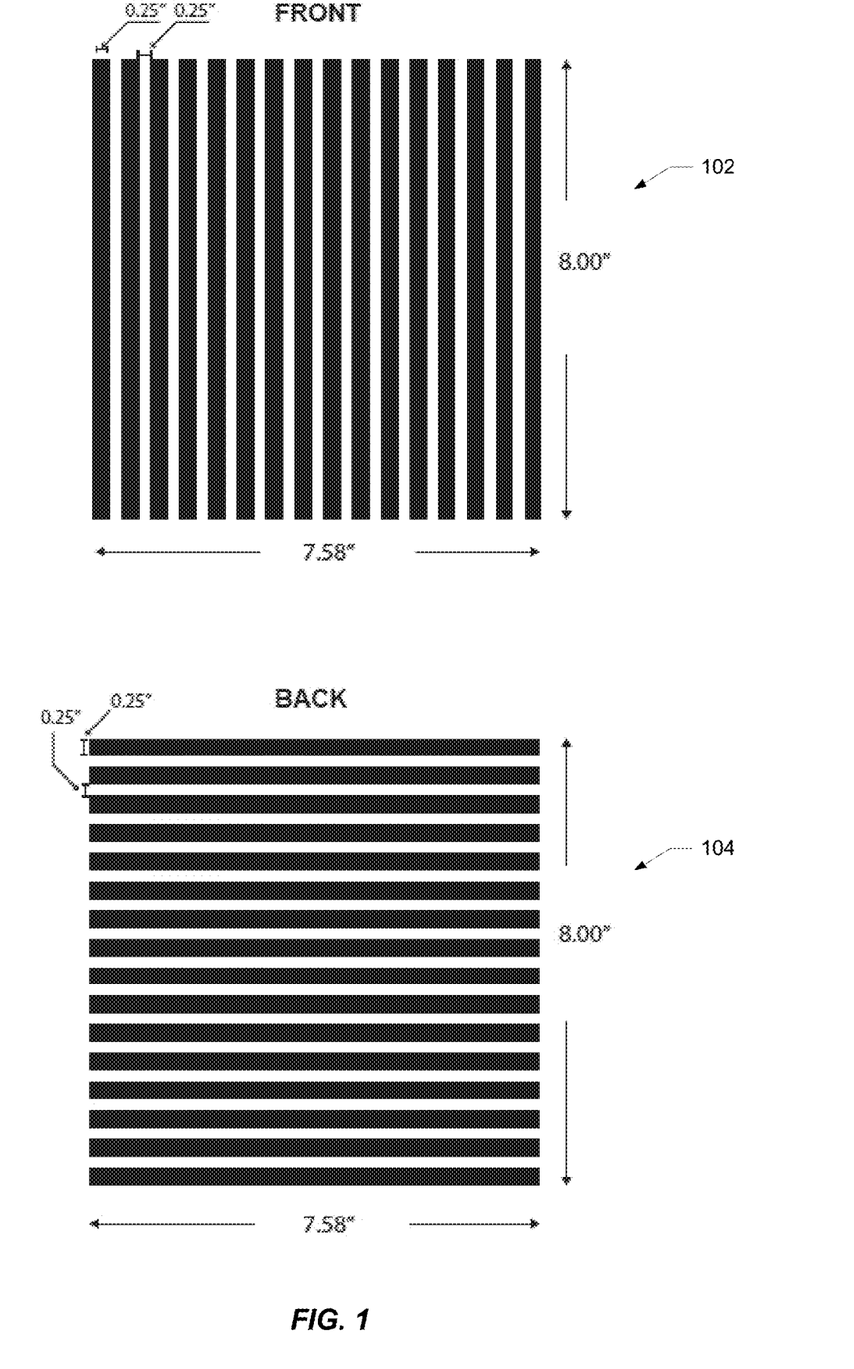
FIG. 1 illustrates a two-sided sensor array.

One example of a two-sided implementation of a sensor array is shown in FIG. 1 and has an array 102 of parallel conductive traces oriented in one direction printed on one side of the piezoresistive fabric, and another array 104 oriented at 90 degrees to the first array printed on the other side of the fabric. This implementation takes advantage of the fact that the piezoresistive fabric is conductive through its thickness (in addition to laterally and across its surface) to implement a pressure sensitive X-Y matrix. By sequentially driving the array on one side of the piezoresistive material and sequentially scanning the array on the other side, both the position and force of a touch event on the array can be detected. Again, because of the sequential selection and activation of the traces, such a configuration is capable of detecting multiple touch events substantially simultaneously. As will be understood, the applications for such a sensor array are virtually limitless.

As will be understood by those of skill in the art, a variety of techniques may be employed to acquire data from sensors constructed as described herein. Some of these techniques may involve a simple measurement of a change in resistance (as determined from a voltage or current) between two conductive traces having the same or similar conductivity. However, for sensors having arrays that include many conductive traces, this may require an unacceptable number of signal lines to route signals both to and from the sensor array. Therefore, according to a particular class of implementations, conductive traces formed on piezoresistive material and having different levels of conductivity are driven and interrogated with signal patterns that reduce the number of signal lines required to achieve sensor configurations that are sensitive to location, pressure, direction, and velocity of applied force.

Figure 2:
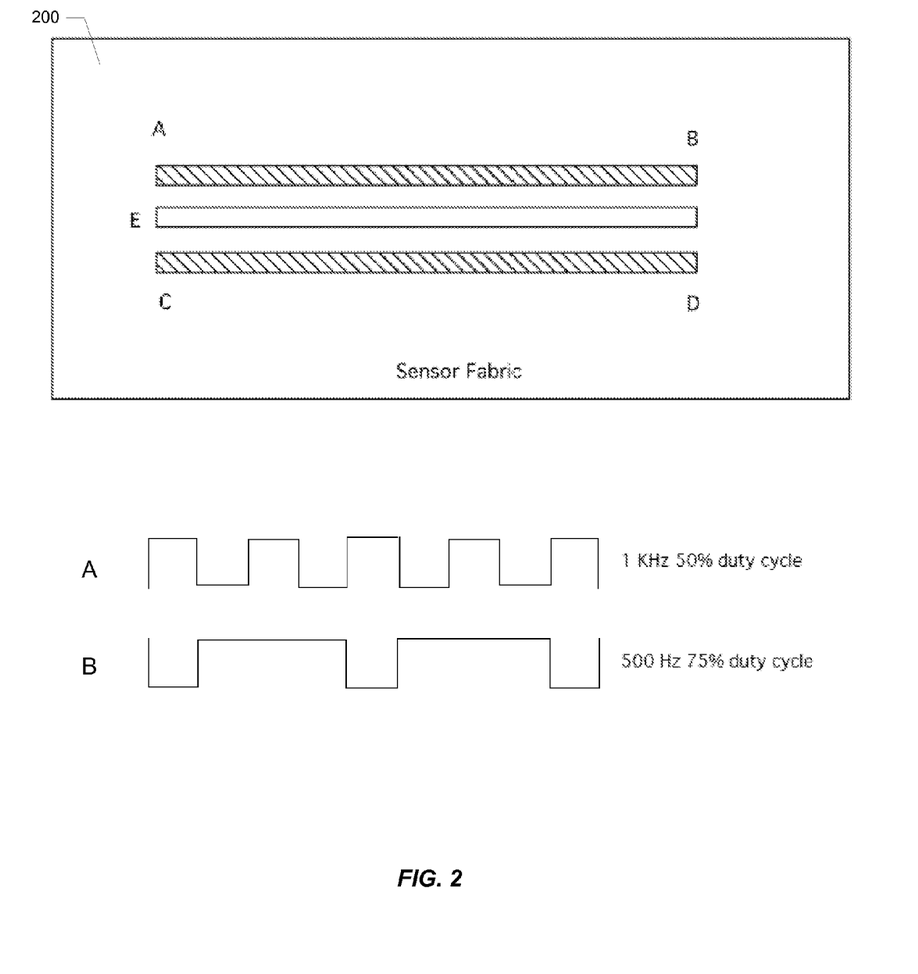
FIG. 2 illustrates another sensor configuration and a technique for acquiring sensor data.

FIG. 2 illustrates an example of such an implementation intended to function as a slider control but with many fewer signal lines than might otherwise be necessary to achieve this functionality. Adjacent (in this case substantially parallel) conductive traces are formed on piezoresistive fabric 200 with one (E) being highly conductive, e.g., near-zero resistance, and the other (AB) being less conductive, e.g., about 100 ohms from A to B if the resistance between traces AB and E without pressure is about 1K ohms. The less conductive trace is driven at opposing ends by different signals A and B (e.g., by one or more signal generators). Pressure on the piezoresistive material reduces the resistance between the two traces which, depending on the location, results in different contributions from signals A and B measured in a mixed signal on the highly conductive trace E. The overall amplitude of the mixed signal also increases with pressure.

According to a particular class of implementations, signals A and B are different pulse trains of the same amplitude; e.g., one at 1 kHz, one with a 50% duty cycle, and the other at 500 Hz with a 75% duty cycle as shown in FIG. 2. The phases of the two pulse trains are synchronized to avoid zero volts being applied to the less conductive trace. Location information can be derived from the mixed signal measured on E as follows. The signal on E is sampled by an A/D converter (e.g., oversampled by a factor of two or more relative to the frequency of the inputs). An inexpensive, general-purpose processor may be employed that can read up to 40 signals with up to 10-bits of resolution, and take 500K samples per second. The same general processor may drive the conductive traces. Thus, arrays with large numbers of sensors may be constructed relatively inexpensively.

The processor evaluates specific amplitudes at specific times that are correlated with the values of signals A and B at those times. The relative contribution from each signal is determined by selecting closely-spaced samples of the mixed signal at times when the respective signals are each known to have a particular value or characteristic, e.g., full amplitude. The ratio of those two measurements represents the relative contributions of each signal to the mixed signal that, in turn, can be mapped to a location between the end points of the AB trace. The pressure or force of the touch event can be determined by measuring peak values of the sampled mixed signal. With this configuration, a pressure sensitive slider can be implemented with only 3 signal lines required to drive the traces and acquire the signal.

According to a particular implementation and as shown in FIG. 2, a second conductive trace CD runs parallel to trace E on the opposing side from trace AB. As with trace AB, the opposing ends of this additional conductive trace are driven with signals C and D; each different from the other as well as signals A and B. As a result, the mixed signal on trace E includes contributions from each of the four signals. This mixed signal may be processed for one or both of the signal pairs in a manner similar to that described above to determine the location of a touch event along the longitudinal axis of the array. The relative amplitudes of the two signal pairs (e.g., derived by measuring amplitudes for the combination of signals A and B and the combination of signals C and D) represent the location of the touch event along the latitudinal axis of the array. This enables measuring of the location of the touch event in two dimensions. This might enable, for example, the capture of a sideways rocking motion of a finger on a key. As with the example described above, the pressure of the touch event may be determined by measuring peak values of the sampled mixed signal. In this way, an XYZ sensor may implemented with five traces (with the Z axis representing the force of the touch event).

Figure 3:
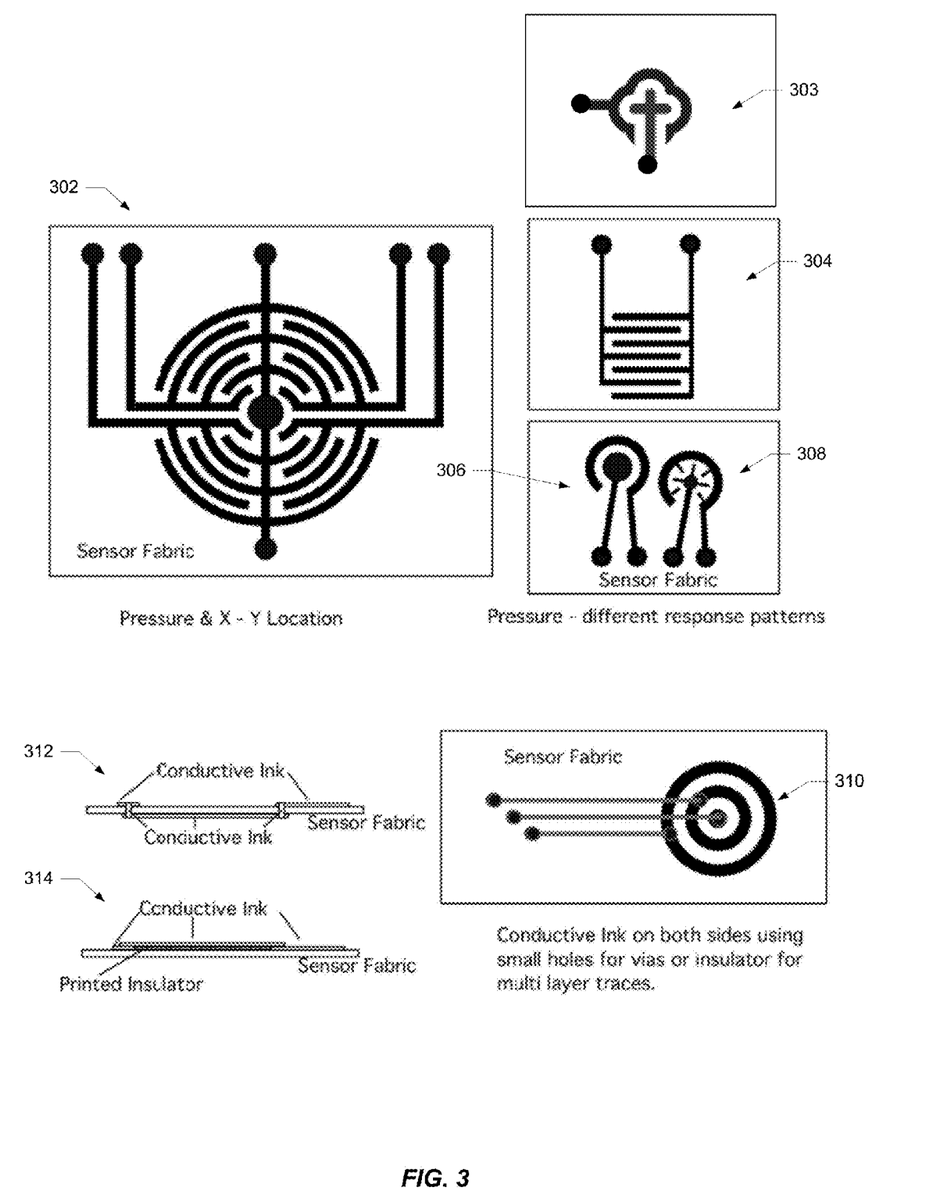
FIG. 3 illustrates various sensor configurations.

FIG. 3 shows a variety of trace patterns formed on flexible piezoresistive material, e.g., conductive ink on piezoresistive fabric, for different applications. Trace pattern 302 implements a four-quadrant sensor that operates similarly to those described, for example, in U.S. patent application Ser. No. 12/904,657 entitled Foot-Operated Controller, now U.S. Pat. No. 8,680,390, and U.S. patent application Ser. No. 13/799,304 entitled Multi-Touch Pad Controller, published as U.S. Patent Publication No. 2013/0239787, the entire disclosures of which are incorporated herein by reference for all purposes. In addition to detecting the occurrence and force of touch events, such a sensor may also be configured to determine the direction and velocity of motion over the quadrants including, for example, both linear and rotational motion relative to the surface of the sensor. Trace patterns 303 (clover and cruciform configuration), 304, 306 and 308 implement sensors that measure the occurrence and force of touch events with different response curves and dynamic ranges resulting from the different configurations. The output signals from such sensors may also be used to detect a variety of distortions and/or deformations of the substrate on which they are formed or with which they are integrated such as, for example, bends, stretches, torsions, rotations, etc.

Trace pattern 310 is used to illustrate both single and double-sided implementations that use either vias or rivets through the piezoresistive material (e.g., configuration 312), insulating materials formed over conductive traces (e.g., configuration 314), or both. As discussed above, such mechanisms enable complex patterns of traces and routing of signals in a manner analogous to the different layers of a printed circuit board.

Figure 4:
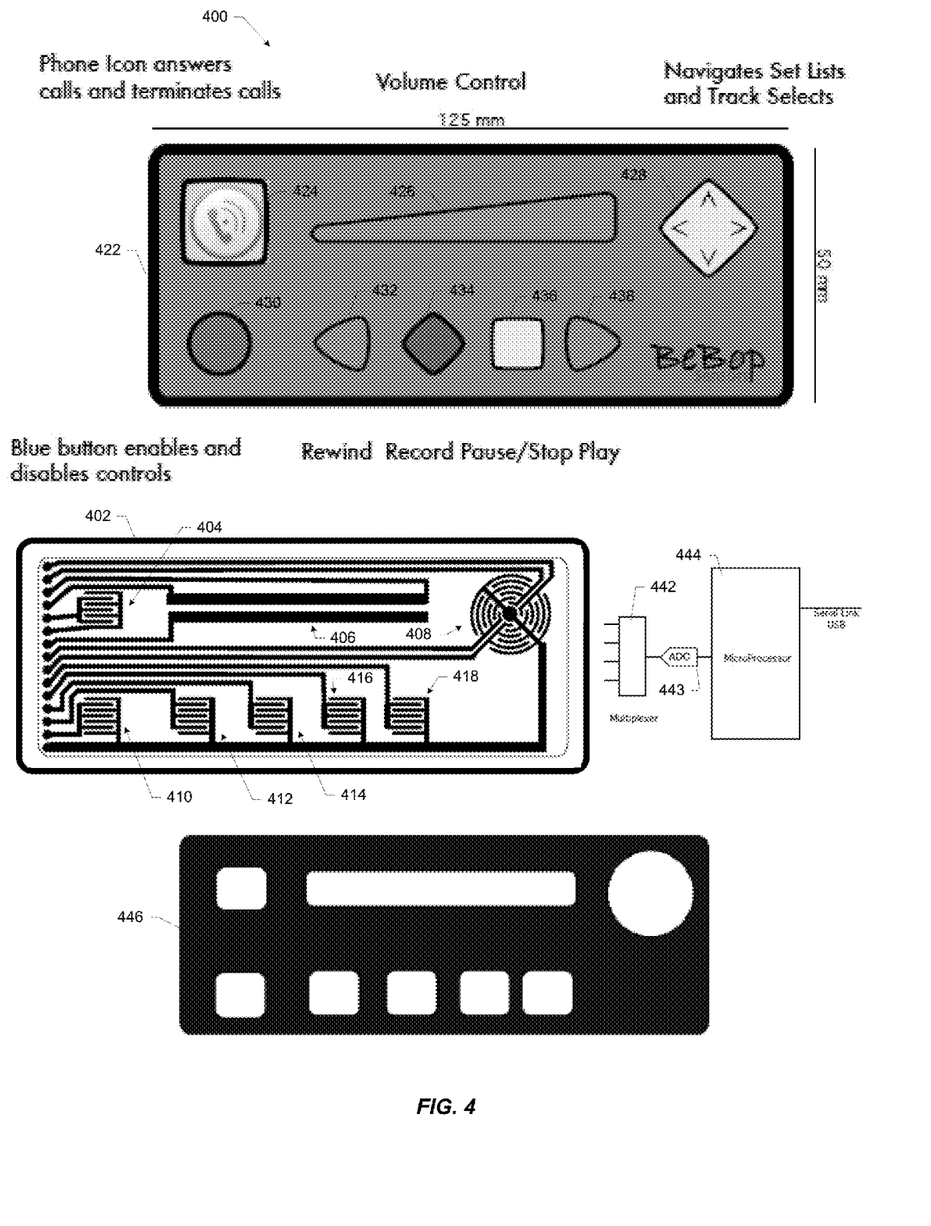
FIG. 4 illustrates a controller that employs a variety of sensor configurations.

It will be appreciated that sensors and sensor arrays designed as described in this disclosure may be employed in a very broad and diverse range of applications in addition to those described. One class of applications includes a wide variety of wearable electronics in which sensing and/or instrumentation components and control and/or processing components are integrated with articles of clothing. One example of such an application is a controller 400 for a smart phone or a digital media player as shown in FIG. 4. Controller 400 may be implemented with an underlying piezoresistive substrate 402 with conductive traces patterns 404-418 formed directly on the substrate to implement sensors that provide different types of controls. The trace patterns are aligned with a particular icon representing the control on an overlying substrate 422 with which a user interacts (i.e., icons 424-438). Alternatively, trace patterns 404-418 may be formed on the opposite side of the same substrate from icons 424-438. The substrate(s) from which controller 400 is constructed may be a piezoresistive fabric that may be incorporated, for example, in articles of clothing, e.g., in the sleeve of a shirt or jacket.

As described elsewhere herein, when pressure is applied to one of the controls, a resulting signal (captured via the corresponding traces) may be digitized and mapped by associated processing circuitry (e.g., multiplexer 442, A-D converter 443, and processor 444) to a control function associated with a connected device, e.g., the smart phone or media player (not shown) via, for example, a USB or Bluetooth connection. As will be appreciated, similar conversion and processing circuitry may be employed with any of the sensor configurations described herein.

In the depicted implementation, trace pattern 404 corresponds to icon 424 and implements a button control that allows the user to answer or terminate calls on his smart phone. Trace pattern 406 corresponds to icon 426 and implements a slider (e.g., such as the one described above with reference to FIG. 2) for volume control of, for example, a media player. Trace pattern 408 corresponds to icon 428 and implements a four-quadrant sensor that may be used for navigation of, for example, set lists, track queues, etc. Trace pattern 410 corresponds to icon 430 and implements an enable/disable control by which controller 400 may be enabled and disabled. Trace patterns 412-418 correspond to icons 432-438, respectively, and implement various media player controls such as, for example, play, pause, stop, record, skip forward, skip back, forward and reverse high-speed playback, etc. As will be appreciated, this is merely one example of a wide variety of controllers and control functions that may be implemented in this manner.

According to a particular implementation, an insulating layer 446 may be printed or deposited on piezoresistive substrate 402 before any of trace patterns 404-418. As can be seen, openings in insulating layer 446 line up with the portions of the trace patterns intended to implement the corresponding control functions. These portions of the trace patterns are therefore printed or deposited directly on the underlying piezoresistive substrate. By contrast, the conductive traces that connect these portions of the trace patterns to the edge of the piezoresistive substrate for routing to the processing circuitry are printed or deposited on insulating layer 446. This will significantly reduce crosstalk noise between these conductors relative to an approach in which they are also printed on the piezoresistive substrate.

According to various implementations, techniques are provided for improving the performance of sensor arrays that are integrated with fabric or other flexible substrates. Examples of sensors and sensor arrays with which the techniques described herein may be employed are described in U.S. patent application Ser. No. 14/299,976 entitled Piezoresistive Sensors and Applications filed on Jun. 9, 2014 and U.S. patent application Ser. No. 14/464,551 entitled Two-Dimensional Sensor Arrays filed on Aug. 20, 2014, the entire disclosures of both of which are incorporated herein by reference for all purposes. However, it should be noted that the techniques described herein are much more widely applicable and may be employed to improve the performance of a wide variety of sensors and sensor arrays.

Forming sensors on flexible piezoresistive material as described above and in the pending patent applications referenced above enables numerous useful devices such as, for example, controllers (e.g., for mobile devices) on the sleeve of a garment, or room controls (e.g., lighting, environmental, security, entertainment, etc.) in the arm of a piece of furniture. But as will be appreciated, there is potential for such sensors to report erroneous values if the material with which the sensors are integrated becomes warped or wrinkled as would be the case in many normal use situations. The techniques described herein make flexible sensor arrays more robust in the face of such conditions.

Figure 5:
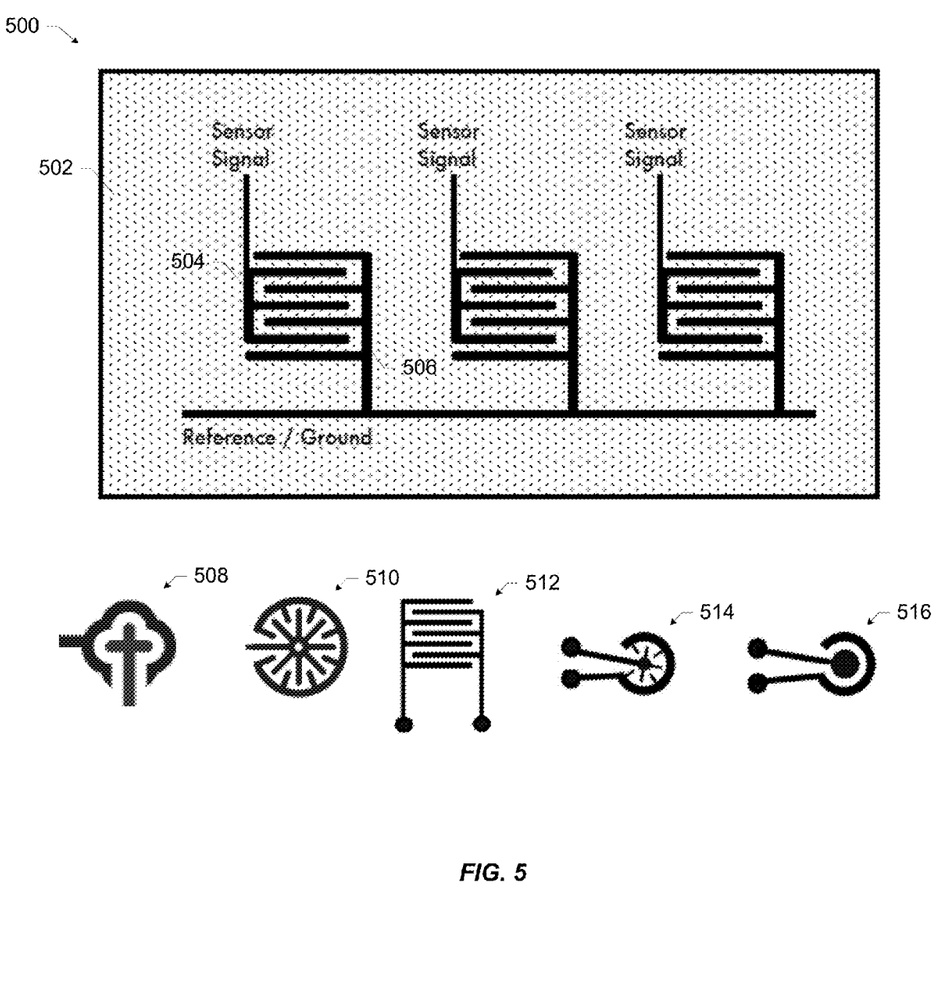
FIG. 5 shows an array of sensor integrated with a flexible substrate.

Specific implementations will now be described with reference to FIGS. 5-9. As will be understood, the specific details of these implementations are merely examples for the purpose of illustrating the techniques enabled by this disclosure. FIG. 5 shows an example of an array 500 of sensors integrated with a flexible substrate 502. Each sensor includes a pair of conductive traces, one of which (trace 504) provides a sensor signal to associated circuitry (not shown), and the other of which (trace 506) is connected to ground or a suitable reference. Some representative examples of other suitable trace patterns 508-516 are shown.

In some implementations, traces 504 and 506 may be formed directly, e.g., by screening or printing, on substrate 502 which is a piezoresistive fabric. However, it should be noted that, among other things, the geometries of the individual sensor trace patterns, the number of traces associated with each sensor, the number, spacing, or arrangement of the sensors, the relationship of the sensors to the substrate, the number of layers or substrates, and the nature of the substrate(s) may vary considerably from application to application, and that the depicted configuration is merely one example for illustrative purposes. As will be appreciated from the following description, the techniques described herein may be employed to improve the performance of a wide array of flexible sensor arrays.

According to a particular class of implementations, in order to promote sensor isolation and/or more consistent performance, areas of the flexible substrate with which the sensor traces are integrated are made stiffer than other areas of the substrate, thereby resulting in less distortion of the sensor traces when the substrate material is distorted, e.g., by wrinkling, warping, or folding. This may be understood with reference to FIG. 6 in which each trace pattern 602 coincides with a stiffener 604 that is integrated with the flexible substrate (not shown for clarity) with which the traces are integrated. Stiffener 604, the shape of which may conform to or be determined by the shape of the corresponding trace pattern 602 as shown, may be implemented in a number of ways. As will be appreciated, if the area of each sensor and its stiffener is small relative to the typical distortions of the substrate, the presence of the stiffener may not be noticeable; a particular advantage for wearable sensor systems.

Figure 6:
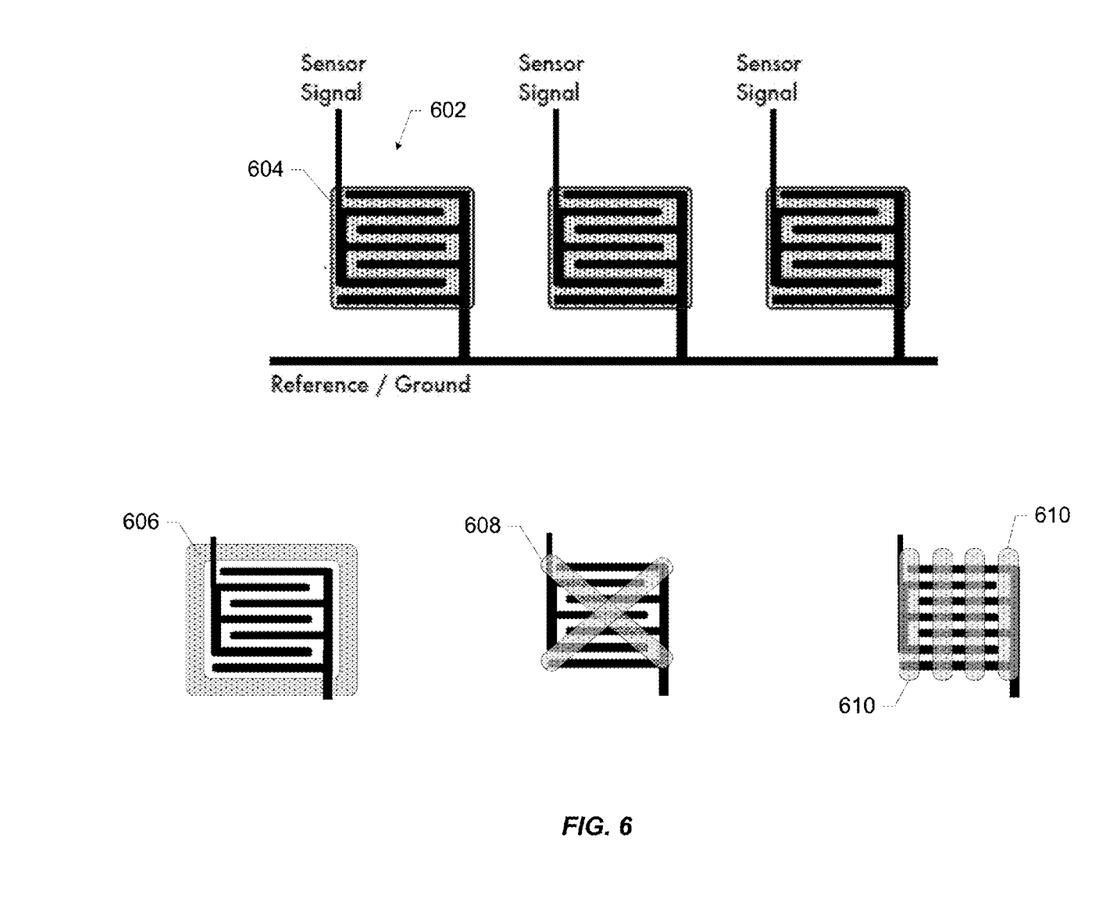
FIG. 6 illustrates the use of stiffeners with sensors on a flexible substrate.

According to some implementations, the stiffener is an additional piece of material that is attached to the flexible substrate in the vicinity of the corresponding trace pattern. For example, the material may be a plastic film (e.g., polyethylene terephthalate or PET) attached to the flexible substrate in the vicinity of the trace pattern. Alternatively, the material may be another piece of fabric attached to the flexible substrate in the vicinity of the trace pattern. Such a fabric might be similar in thickness and density to the substrate, be thicker and/or denser than the substrate, or even be thinner and/or less dense than the substrate (i.e., with the combination of the substrate and the additional material still being stiffer than the substrate and trace pattern alone). As yet another alternative, a stiffening material such as DuPont 5036 Dielectric ink may be silk-screened or printed on the flexible substrate in the vicinity of the trace pattern.

It should be noted that implementations are contemplated in which the stiffener is not a single piece of material and/or does not necessarily conform to the shape of the trace pattern in the same way as, for example, stiffener 604. Rather, implementations are contemplated in which the stiffener may be one or more pieces or depositions of material that may be any of a variety of shapes that achieve the desired effect, i.e., that resist distortion of the trace pattern in the presence of distortion of the flexible substrate with which the trace pattern is integrated. Examples of alternative stiffener configurations are shown in FIG. 6 (i.e., configurations 606-610). A variety of other suitable alternatives will be appreciated from the diversity of these examples.

In some of these implementations, the stiffener is attached to or formed on the flexible substrate on the opposite side of the substrate from the trace pattern. However, it should be noted that implementations are contemplated in which the stiffener is on the same side of the flexible substrate as the trace pattern, or even on both sides of the flexible substrate. For some implementations in which the stiffener is on the same side of the substrate as the trace pattern it may be preferable that the material of the stiffener have little or no direct overlap with the traces so as not to reduce sensor response. For example, the stiffener material could be placed in the spaces between the traces. According to some implementations, a stiffener may function to raise the sensor surface profile, thereby improving selectivity or sensitivity if a fabric overlay is highly compressive, e.g., fleece or thick knit material as may be found in certain styles of clothing. In view of the foregoing, the scope of the present disclosure should not be limited by reference to particular ones of the examples described.

According to another class of implementations, one or more additional traces are integrated with the flexible substrate in association with each sensor trace pattern. The additional traces provide information about the state of the flexible substrate that may be used to modify the sensor output for the associated trace patterns in a manner that compensates for the effects of distortion of the flexible substrate on the sensor output. The proximity of the additional traces to the associated trace patterns and the configuration of the additional traces should be such that the additional traces experience the distortion of the flexible substrate in a manner similar to that experienced by the associated trace patterns.

Figure 7:
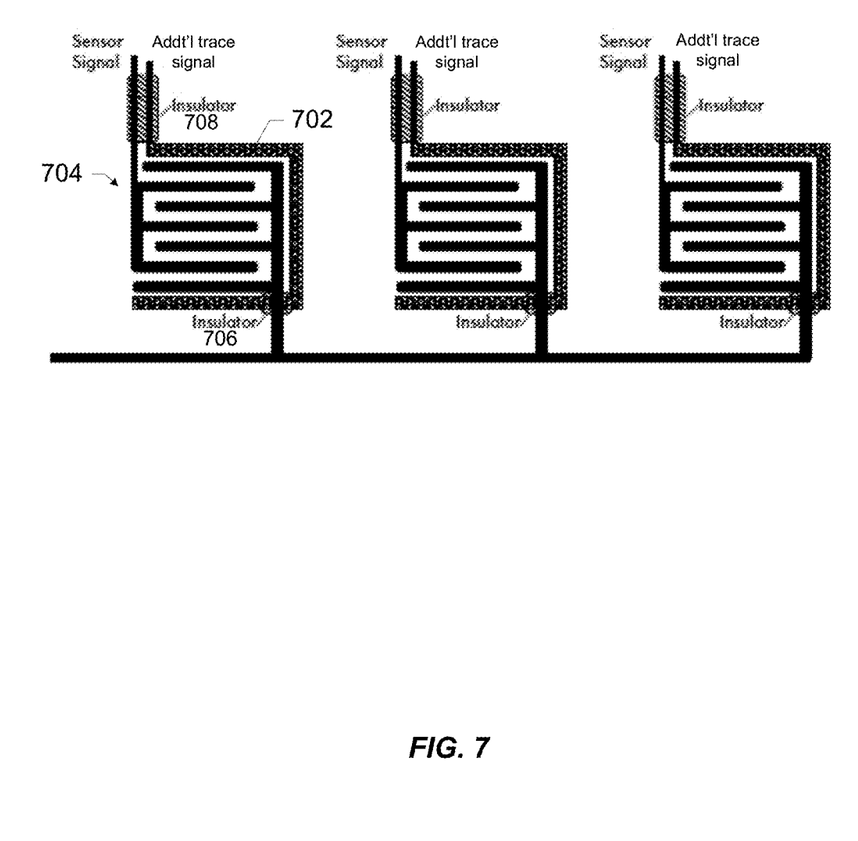
FIG. 7 illustrates the use of additional traces to compensate for the effects of distortion of the flexible substrate.
Figure 8:
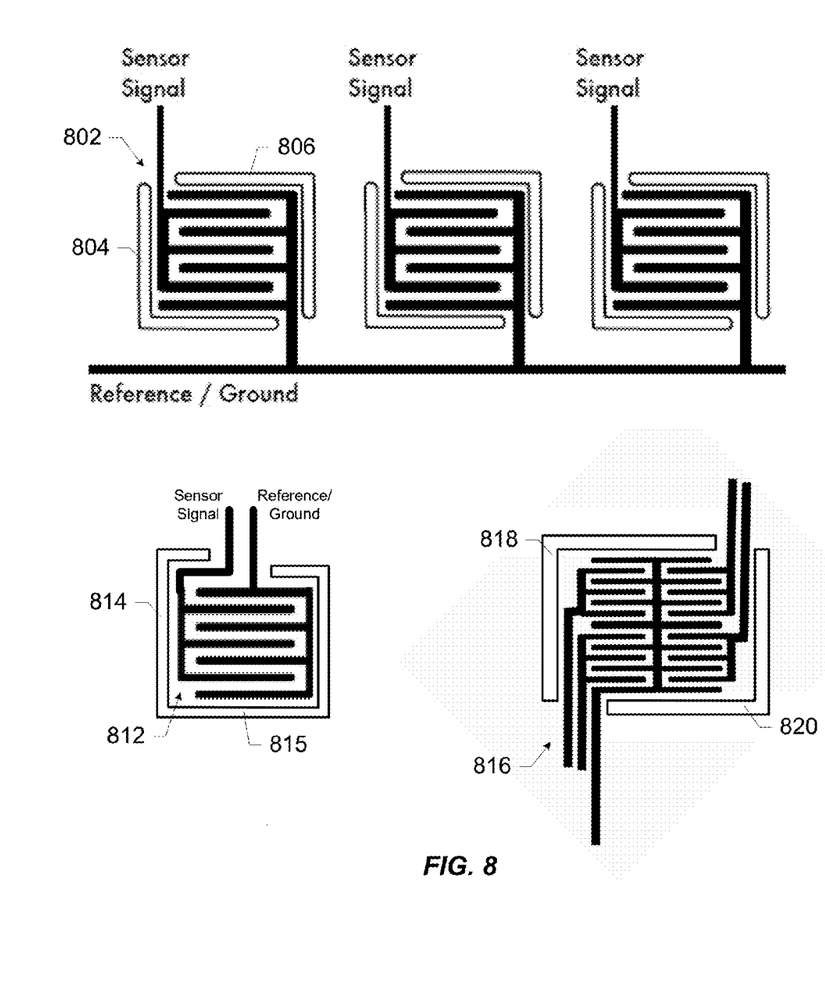
FIG. 8 illustrates the use of isolation cutouts with sensors on a flexible substrate.

According to a particular implementation illustrated in FIG. 7, additional trace 702 "mimics" the geometry of the sensor trace pattern 704, largely encompassing the trace pattern such that local distortion of the flexible substrate (not shown) experienced by the trace pattern is similarly experienced by the additional trace. If this "mimic" trace shares a common signal (e.g., the ground path or a drive signal) with the active sensor, its response to distortion should closely match the response of the sensor trace pattern to the same distortion. Note that trace 702 is not directly electrically connected to either of the traces of trace pattern 704 (e.g., through the use of insulator 706). Insulation (e.g., 708) may also be provided to avoid cross-talk between the information on the additional trace and the sensor output; particularly for implementations that employ piezoresistive material as the substrate with which the traces are integrated.

According to various implementations, the signal(s) from each set of additional trace(s) is a separate input to the processing circuitry (e.g., A/D converter and processor; not shown) that also receives and processes the sensor outputs from the trace patterns. The processor may use this additional information to compensate for distortion of the flexible substrate in a number of ways depending on the particular application. For example, the warp of a fabric substrate will have a similar electrical effect on signals received from the trace pattern and the mimic trace. In the simple case, the processor can subtract a value representing the signal from the mimic trace from a value representing the signal from the primary trace pattern; which act, effectively, like a differential pair. Because the sensor trace pattern will produce signals when activated by applied force that the mimic trace will not detect, the signal that is unique to the sensor trace pattern can be derived by this subtraction. It should be noted that this approach is also applicable to multi-quadrant sensors that produce X-Y data.

For example, where the trace pattern implements a simple on-off switch, the signal from the additional trace could be used to adjust the threshold used by the processor to determine when the switch is activated, i.e., either to turn on or turn off. That is, if the signal from the additional trace increases by some amount because of distortion of the flexible substrate, the processor may use this information to adjust the switch threshold accordingly, e.g., increase the threshold by some amount proportional to the signal from the additional trace.

In another example, where the trace pattern implements a sensor that is sensitive to applied force, the signal from the additional trace can be used to reduce the sensor signal (e.g., by subtraction) to normalize the sensor signal.

In yet another example, two-dimensional sensor arrays, the signals from additional traces associated with an array of trace patterns can be used to compensate for any contributions from distortion of the flexible substrate to the determination of the location of a touch event on the array.

According to another class of implementations, trace patterns integrated with a flexible substrate are physically isolated from distortions of the surrounding substrate through the use of isolation cutouts in the substrate in the vicinity of each trace pattern. By isolating the portion of the substrate with which the trace pattern is integrated from the surrounding substrate, the trace pattern is less susceptible to distortions of the base material.

For trace patterns that include two conductive traces (e.g., one connected to a reference and one providing a sensor output signal), the routing of conductors to the trace pattern may be done to improve the isolation. This may be understood with reference to FIG. 8 in which trace patterns 802 have sensor signal output and reference/ground conductors extending from opposing edges of trace patterns 802 in opposite directions on the flexible substrate (not shown). This allows for two isolation cutouts 804 and 806 to create significant isolation between trace pattern 802 and the surrounding substrate. In an alternative example, the sensor signal output and reference/ground conductors extend from trace pattern in the same direction enabling a single isolation cutout 814 to create significant isolation between trace pattern 812 and the surrounding substrate. Such implementations may benefit from some form of support for the isolated trace pattern such as, for example, one or more pieces of bridging material connecting to the rest of the substrate (e.g., a location 815), or one or more additional layers of material over or under the substrate (not shown).

For larger arrays of closely spaced sensor trace patterns, placing isolation cutouts at the corners of the array provides isolation from distortion of the flexible substrate along the two major axes of the base material. One example of this is represented by trace pattern 816 of FIG. 8, the traces of which implement a four-quadrant sensor. Isolation cutouts 818 and 820 may be placed at the corners of the array as shown. Trace patterns and arrays of trace patterns having other geometries will have different shapes and locations for isolation cutouts that relate to the primary modes of distortion for the base material, the configuration of the individual trace patterns, and/or the configuration of the array of trace patterns.

Figure 9:
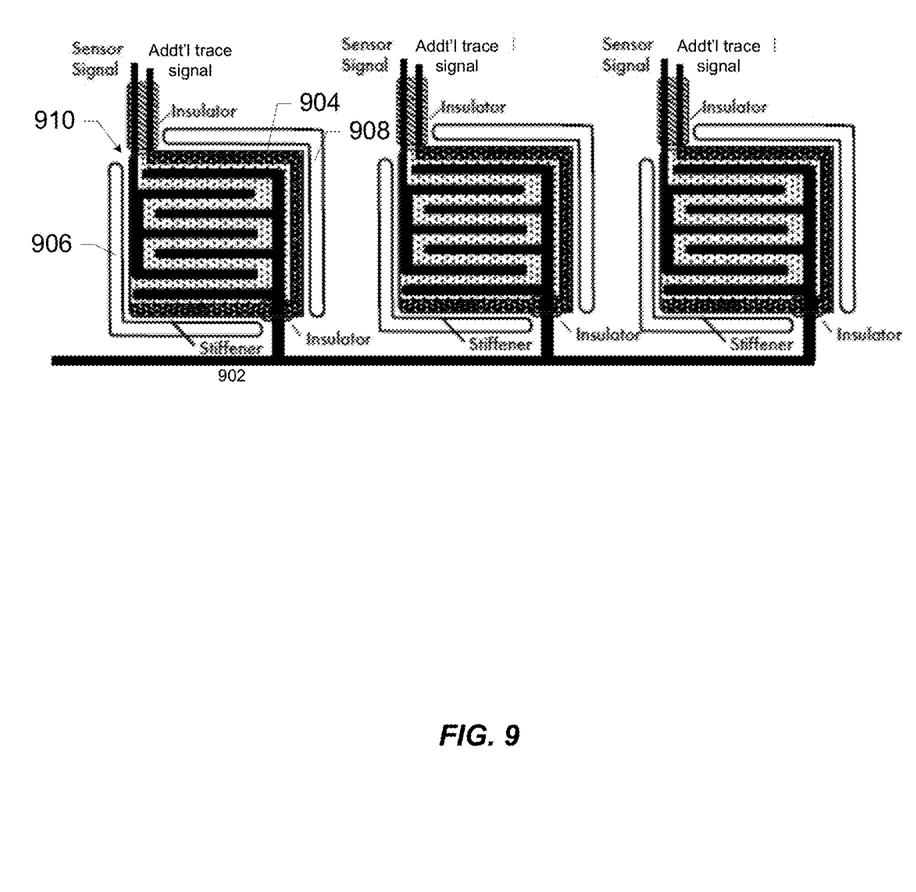
FIG. 9 illustrates a combination of multiple sensor isolation techniques.

It should also be noted that the techniques described herein may be used in various combinations to promote sensor isolation and/or more consistent performance of sensor systems. FIG. 9 shows an example in which stiffeners 902, additional traces 904, and isolation cutouts 906 and 908 are provided in the vicinity of trace patterns 910 to provide physical isolation of trace patterns 910 from the surrounding flexible substrate (not shown). In the example shown in FIG. 9, additional traces 904 are provided within cutouts 906 and 908 and are also adjacent stiffeners 902 to ensure they experience distortion of the substrate in a manner similar to the corresponding sensor trace patterns.

While various specific implementations have been particularly shown and described, it will be understood by those skilled in the art that changes in the form and details of the disclosed implementations may be made without departing from the spirit or scope of this disclosure. In addition, although various advantages, aspects, and objects have been discussed herein with reference to various implementations, it will be understood that the scope of this disclosure should not be limited by reference to such advantages, aspects, and objects.

What is claimed is:

1. A sensor system, comprising:
a flexible piezoresistive substrate;
an array of sensors, each sensor in the array comprising a sensor trace pattern including two or more conductive traces integrated with the flexible piezoresistive substrate; and
a plurality of stiffeners, each stiffener corresponding to one of the sensors and being attached to or integrated with a first area of the flexible piezoresistive substrate that is overlapping with a second area of the flexible piezoresistive substrate occupied by the sensor trace pattern of the corresponding sensor, each stiffener being physically separate from others of the stiffeners and resisting distortion of the corresponding trace pattern when the flexible piezoresistive substrate is distorted.

2. The sensor system of claim 1, wherein the flexible piezoresistive substrate is a piezoresistive fabric.

3. The sensor system of claim 1, wherein each stiffener is a plastic film, a fabric, or a cured stiffening agent.

4. The sensor system of claim 1, wherein each stiffener is attached to an opposing side of the flexible piezoresistive substrate from the corresponding sensor trace pattern.

5. The sensor system of claim 1, wherein each stiffener includes multiple stiffening components.

6. The sensor system of claim 1, wherein each stiffener substantially conforms to a shape of the second area of the flexible piezoresistive substrate occupied by the corresponding sensor trace pattern.

7. A sensor, comprising:
a flexible substrate;
a sensor trace pattern including two or more conductive traces integrated with the substrate;
an additional trace integrated with the substrate in a vicinity of the sensor trace pattern; and
circuitry configured to receive a sensor output signal from the sensor trace pattern and a compensation signal from the additional trace, and to detect activation of the sensor with reference to the sensor output signal and using the compensation signal to compensate for distortion of the flexible substrate.

8. The sensor of claim 7, wherein the flexible substrate is a piezoresistive fabric.

9. The sensor of claim 7, wherein the additional trace extends at least partially around a perimeter of the sensor trace pattern.

10. The sensor of claim 7, wherein the circuitry is configured to detect activation of the sensor by modifying the sensor output signal using the compensation signal.

11. The sensor of claim 7, wherein the circuitry is configured to detect activation of the sensor by modifying a sensor activation threshold using the compensation signal.

12. The sensor of claim 7, wherein the circuitry is configured to detect activation of the sensor by modifying an operational parameter of the sensor using the compensation signal.

13. The sensor of claim 7, wherein the circuitry is configured to circuitry configured to use the compensation signal to compensate for an environmental condition affecting the sensor.

14. A sensor, comprising:
a flexible piezoresistive substrate; and
a sensor trace pattern including two or more conductive traces integrated with the substrate;
wherein the flexible substrate includes one or more apertures in a vicinity of the sensor trace pattern that physically isolate the traces of the sensor trace pattern from physical distortion of the flexible substrate and that at least partially electrically isolate the traces of the sensor trace pattern from adjacent sensor trace patterns.

15. The sensor of claim 14, wherein the flexible piezoresistive substrate is a piezoresistive fabric.

16. The sensor of claim 14, wherein the one or more apertures extend at least partially around a perimeter of the sensor trace pattern.

17. The sensor of claim 14, wherein the one or more apertures includes a plurality of apertures around the sensor trace pattern.

18. The sensor of claim 14, wherein the one or more apertures substantially conform to a shape of the sensor trace pattern.

* * * * *